United States Patent
Lexa et al.

(10) Patent No.: US 9,927,552 B2
(45) Date of Patent: Mar. 27, 2018

(54) SYSTEM AND METHOD FOR ECCENTERING CORRECTION

(71) Applicant: General Electric Company, Schenectady, NY (US)

(72) Inventors: Michael Anthony Lexa, Niskayuna, NY (US); Meena Ganesh, Niskayuna, NY (US); John Edward Smaardyk, Kingwood, TX (US); Donald Kenney Steinman, Missouri City, TX (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 373 days.

(21) Appl. No.: 14/705,059

(22) Filed: May 6, 2015

(65) Prior Publication Data
US 2016/0327681 A1    Nov. 10, 2016

(51) Int. Cl.
    *G01V 5/12*    (2006.01)
    *G01V 5/08*    (2006.01)
    *G01T 7/00*    (2006.01)

(52) U.S. Cl.
    CPC ............... *G01V 5/12* (2013.01); *G01T 7/005* (2013.01); *G01V 5/08* (2013.01)

(58) Field of Classification Search
    CPC ............ G01V 5/12; G01V 5/08; G01T 7/005
    USPC ........................................................ 250/265
    See application file for complete search history.

(56) References Cited

U.S. PATENT DOCUMENTS

| | | | |
|---|---|---|---|
| 4,783,995 A | 11/1988 | Michel et al. | |
| 4,928,269 A * | 5/1990 | Kimball | G01V 1/50 181/105 |
| 4,950,892 A | 8/1990 | Olesen | |
| 5,287,928 A | 2/1994 | Healy et al. | |

(Continued)

FOREIGN PATENT DOCUMENTS

GB       2349947 A    11/2000
WO    2006047295 A1    5/2006

OTHER PUBLICATIONS

PCT Search Report and Written Opinion issued in connection with corresponding PCT Application No. PCT/US2016/031243 dated Jul. 21, 2016.

(Continued)

*Primary Examiner* — David Porta
*Assistant Examiner* — Gisselle Gutierrez
(74) *Attorney, Agent, or Firm* — Pabitra K. Chakrabarti (57) ABSTRACT

A system for generating eccentering corrected response includes a logging tool configured to examine a material filled in an annular space to generate a tool response. The material is filled in an annular space formed by an outer conduit and an inner conduit disposed in the outer conduit. The logging tool is disposed in an inner conduit. The tool response includes scattered gamma ray photon counts distorted by a radial shift of the logging tool. The system includes a data transmission device coupled to a plurality of detectors and configured to transmit data detected by the plurality of detectors. The system also includes a computer processor linked to the data transmission device and configured to receive the tool response. The computer processor is configured to process the tool response and generate an eccentered corrected response by correcting effects of the radial shift in the tool response using eccentering correction technique.

17 Claims, 10 Drawing Sheets

(56) References Cited

U.S. PATENT DOCUMENTS

| | | | |
|---|---|---|---|
| 6,554,064 B1 | 4/2003 | Restarick et al. | |
| 6,554,065 B2 | 4/2003 | Fisher et al. | |
| 6,684,951 B2 | 2/2004 | Restarick et al. | |
| 6,815,665 B2 | 11/2004 | Storm et al. | |
| 7,059,404 B2 | 6/2006 | Flecker et al. | |
| 7,228,900 B2 | 6/2007 | Schultz et al. | |
| 7,631,697 B2 | 12/2009 | Bhavsar | |
| 8,561,694 B2 | 10/2013 | Hemblade | |
| 2002/0190198 A1 | 12/2002 | Mickael | |
| 2006/0106541 A1* | 5/2006 | Hassan | G01V 1/48 702/6 |
| 2007/0284518 A1* | 12/2007 | Randall | G01T 7/005 250/261 |
| 2008/0035838 A1* | 2/2008 | Caruba | H05K 1/0219 250/250 |
| 2008/0307875 A1* | 12/2008 | Hassan | E21B 47/091 73/152.16 |
| 2009/0084176 A1* | 4/2009 | Hassan | E21B 47/08 73/152.57 |
| 2010/0017134 A1 | 1/2010 | Steinman et al. | |
| 2012/0119077 A1 | 5/2012 | Smaardyk et al. | |
| 2013/0009049 A1 | 1/2013 | Smaardyk et al. | |
| 2014/0291500 A1 | 10/2014 | Smaardyk et al. | |

OTHER PUBLICATIONS

Hertzog et al.,"Gravel Pack Imager Tool (GPI): Precise and Accurate Knowledge of Gravel Pack Integrity", Society of Petroleum Engineers, SPE 135060, pp. 10, 2010.

Fisher et al.,"Gravel-Pack Evaluation Using a Memory Gamma-Gamma Density Tool", Society of Petroleum Engineers, SPE 58779, pp. 15, Feb. 23-24, 2000.

Abramowitz et al., "Numerical Interpolation, Differentiation, and Integration", Chapter 25 from book "Handbook of Mathematical Functions with Formulas, Graphs, and Mathematical Tables.", pp. 877-924, 1964.

R J Leveque, "Finite Difference Approximations", Chapter 1 from book "Finite Difference Methods for Ordinary and Partial Differential Equations", Society for Industrial and Applied Mathematics, pp. 3-9, 2004.

* cited by examiner

SYSTEM AND METHOD FOR ECCENTERING CORRECTION

BACKGROUND

The invention relates generally to monitoring the conditions of a subterranean well in a borehole by a gravel pack imaging (GPI) tool. Specifically, the invention is related to processing techniques for detecting a defect within the annular space of a subterranean well when signals acquired from GPI tool are affected by motion distortions.

Subterranean areas of interest beneath the surface are accessed through a borehole. The boreholes are surrounded by subterranean material, such as sand, that may migrate out of the boreholes with the oil, gas, water, and/or other fluids produced by the wells. A casing is inserted in a borehole and is held into place by cementing space between the outer surface of the casing and the surrounding earth. The borehole may also include other piping such as production tubing, and inner casing, and conductor casing inside the outermost casing. The fluid produced from the well flows to the surface through the production tubing. During the life of a subterranean well, the production tubing may have to be removed for repair and maintenance activities. There may also be a need to remove a portion or all of one or more of the other piping of the subterranean well.

The presence of sand and other particulate material may affect the functioning of various producing equipment, such as tubing, pumps, and valves. The particulate material may partially or fully clog the well thus reducing the fluid production capabilities of the wells. Maintenance of wells in such scenarios is expensive. The presence of the particulates in the hydrocarbon fluids from the wells necessitates additional processing at the surface thus increasing the cost of extraction of fluids.

Boreholes are suitably designed and constructed to prevent mixing of particulates with the fluids and are to be monitored for effectiveness of the design through the life of the well. Borehole design includes providing a perforated base pipe positioned proximate to the formation site of interest. A screen is disposed around the perforated base pipe and a coarse particulate material, such as sand, or proppants, which are typically sized and graded and collectively referred to as "gravel," is disposed in the subterranean well between the screen and the borehole. The formation fluid flows through the screen and the gravel in the pack prevents formation fines and sand from flowing into the borehole and mixing with the produced fluids.

Over time, both distribution and density of the gravel in the borehole annulus can change for various reasons. For example, finer sand or other such particulate materials may enter and block the screen openings. The material of the gravel pack may be non-uniformly distributed due to borehole conditions such as non-uniform flow rates. During the formation of the gravel pack, void areas may be created in the material around the borehole. Non uniform material distribution around the borehole would increase the possibility of introduction of particulate materials in the extracted fluid. During the production of the fluid, particulates within the drilling fluids may form a cement like substance within the annular space between two successive concentric pipes coupling together the concentric pipes.

The material of the borehole annulus is to be monitored for detection of defects for initiating effective steps in a cost effective way. There is a need to devise techniques for processing signals acquired from GPI tool from the annulus.

BRIEF DESCRIPTION

In one aspect of the present technique, a system for generating eccentering corrected response usable for detecting a defect in the annular space is disclosed. The system includes a logging tool disposed in an inner conduit configured to examine a material filled in an annular space formed by an outer conduit and the inner conduit disposed in the outer conduit to generate a tool response. The logging tool includes a plurality of detectors and the tool response includes scattered gamma ray photon counts distorted by a radial shift of the logging tool. The system includes a data transmission device coupled to the plurality of detectors and configured to transmit data detected by the plurality of detectors. The system also includes at least one computer processor communicatively coupled to a memory and the data transmission device via a communications bus and configured to receive the tool response. The at least one computer processor is configured to generate an eccentering corrected response by correcting effects of the radial shift in the tool response using an eccentering correction technique.

In another aspect of the present technique, a method implemented by at least one computer processor for generating eccentering corrected response usable for detecting a defect in the annular space is disclosed. The method includes receiving a tool response from a logging tool disposed in an inner conduit configured to examine a material filled in an annular space formed by an outer conduit and the inner conduit disposed within the outer conduit. The tool response includes scattered gamma ray photon counts distorted by a radial shift of the logging tool. The method further includes generating an eccentering corrected response by correcting effects of the radial shift in the tool response using an eccentering correction technique.

In another aspect of the present technique, a non-transitory computer readable medium having a program to instruct at least one computer processor is disclosed. The program instructs the at least one computer processor to receive a tool response from a logging tool disposed in an inner conduit configured to examine a material filled in an annular space formed by an outer conduit and the inner conduit disposed within the outer conduit. The tool response comprises scattered gamma ray photon counts distorted by a radial shift of the logging tool. The program further instructs the at least one computer processor to generate an eccentering corrected response by correcting effects of the radial shift in the tool response using an eccentering correction technique. The eccentering corrected response is usable for detecting a defect in the annular space.

DRAWINGS

These and other features and aspects of embodiments of the present invention will become better understood when the following detailed description is read with reference to the accompanying drawings in which like characters represent like parts throughout the drawings, wherein.

DETAILED DESCRIPTION

Embodiments of a system and a method for correcting motion artifacts of tool response from a logging tool includes processing the tool response to correct eccentering distortions caused by radial shift of the logging tool. The logging tool is disposed in an inner conduit and is configured to examine a material filled in an annular space formed by an outer conduit and the inner conduit disposed within the outer conduit. The eccentering corrected response is usable for detecting voids in the annular space.

The term 'tool' used herein refers to a logging tool in a borehole of a subterranean well such as an oil well. The tool is designed and configured to acquire data related to the material in the annular space of the well. The term 'material' refers to drilling fluid and other particulates that precipitate out of the drilling fluid and other such substances encountered in the borehole environment. The term 'scattering events' refers to the inelastic scattering such as Compton scattering. The terms 'tool response', 'detector data', 'count response' and 'count rate' refer to photon measurements acquired by the detectors of the scattering events in units of counts per unit time. The term 'energy window' refers to a range of values of the energies of the detected photons. The term 'defect' refers to a void region or non-uniform regions with in the annulus between the gravel pack such as air pockets, and gaps.

Figure 1:
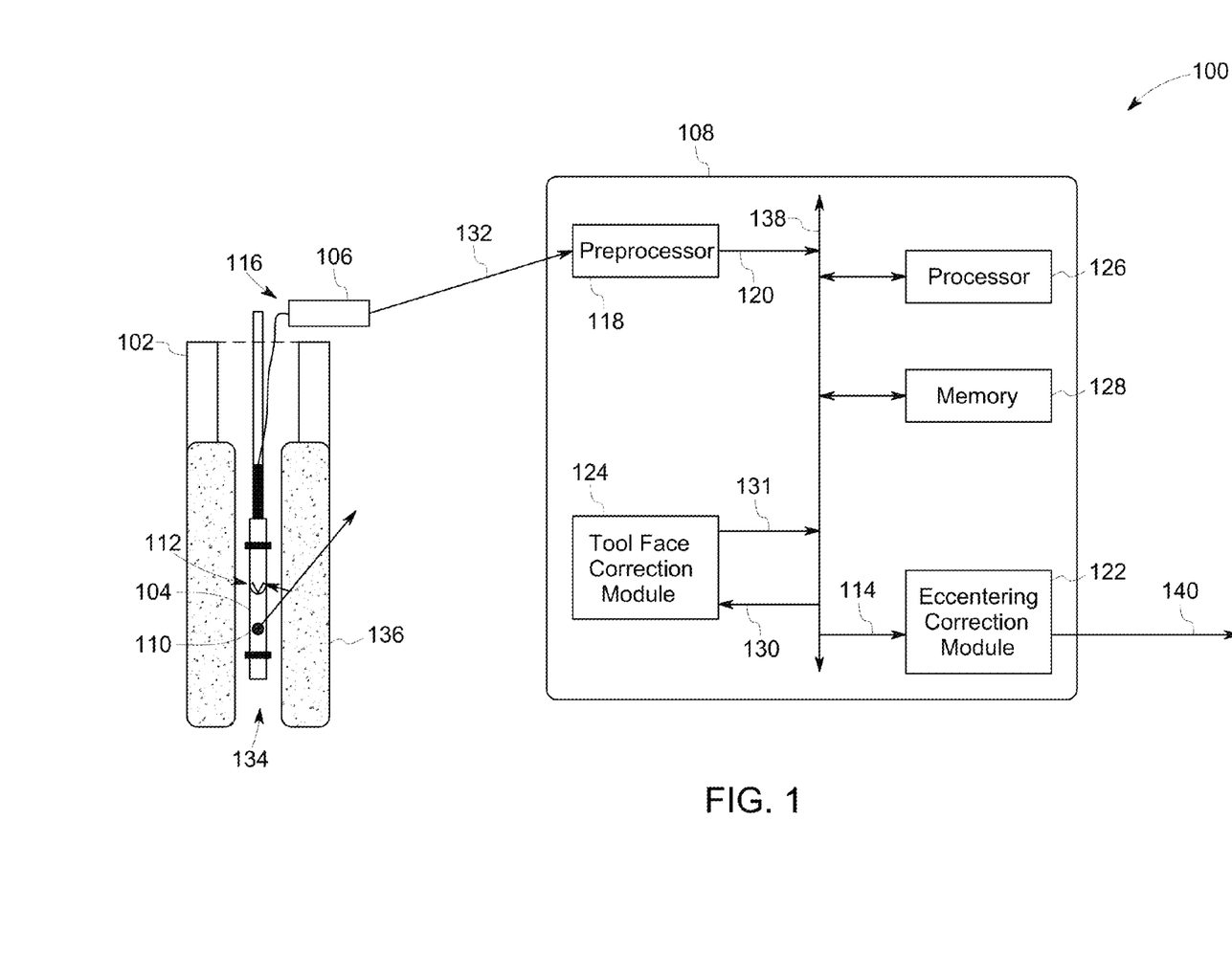
FIG. 1 illustrates a system for correcting distortions in tool response due to movements of a logging tool for determining density of material in an annular space of a subterranean well in accordance with an exemplary embodiment.

FIG. 1 illustrates a well site 100 having capability of correcting distortions in tool response due to movements of the logging tool in an annular space of the subterranean well in accordance with an exemplary embodiment. The well site 100 includes a tool 104 disposed in an annular space 134 of the borehole 102. The tool 104 for generating tool response 132 is explained in detail in a subsequent paragraph with reference to a subsequent figure. The annular space 134 has an inner conduit and an outer conduit containing materials 136 characterized by one or more densities. The tool 104 is configured to be accommodated within and move within a channel of the inner conduit disposed within the outer conduit. The tool comprises a radiation source 110 and a plurality of radiation detectors 112. The radiation source 110 in one embodiment is a gamma-ray source. The photons emitted by the radiation source 110 are directed to the material 136 and scattering events are generated from interaction of the material 136 in the annular space with radiation from the radiation source. The plurality of radiation detectors 112 are coupled to a transmission device 106 via an electric cable 116 and configured to detect the scattered photons and generate tool response 132.

The tool response 132 is affected by an eccentering distortion when the tool 104 is shifted in a radial direction. In some embodiments, the tool response 132 is also affected by a tool face distortion when the tool 104 is rotated in longitudinal direction. The tool response 132, affected by the eccentering distortion is received by a motion distortion correction system 108 and generates an eccentering corrected response 140.

The motion distortion correction system 108 includes a preprocessor module 118, an eccentering correction module 122, at least one computer processor 126, and a memory module 128. In embodiments, where the tool response is also affected by the tool face distortion, a tool face correction module 124 is also present in the motion distortion correction system 108. The modules 118, 124, 122, 126, 128 are all interconnected by a communications bus 138.

The preprocessor module 118 is communicatively coupled to the transmission device 106 and configured to receive tool response 132 representative of density of the material in the annular space. In one embodiment, the tool response refers to a vector of six elements with each element representing count response from one of the six detectors of the logging tool. The tool response may be indexed by at least one of a time instant and a depth value. In an exemplary embodiment, the preprocessor module 118 is configured to perform a low pass filtering of the tool response to reduce high frequency noise components and eliminate transient noise effects. The preprocessor module 118 buffers the tool response 132 over a period of time and generates a preprocessed response 120 in a suitable format for correcting motion distortions. The preprocessor module 118 also performs various signal conditioning operations on the tool response such as normalization, and rejection of outlier values.

The eccentering correction module 122 is communicatively coupled to the communications bus 138 and configured to receive an uncorrected response 114. The eccentering correction module 122 is further configured to generate the eccentering corrected response 140 using an eccentering correction technique. In one embodiment, the eccentering correction includes minimizing response components generated due to the presence of voids in the annular space. The response components due to the presence of voids correspond to one or more large response components masking the eccentering distortion signals. Further, a sinusoidal component due to the presence of eccentering distortion are eliminated from the uncorrected response 114 to generate the eccentering corrected response 140. In one embodiment, the uncorrected response 114 is the preprocessed response 120. In an alternate embodiment, the uncorrected response 114 is a tool face distortion corrected response generated from the tool face correction module 124. The eccentering correction module 122 processes the uncorrected response 114 to generate the eccentering corrected response 140.

The tool face correction module 124 is communicatively coupled to the communications bus 138 and configured to receive an input signal 130 having tool face distortion, perform a tool face correction technique on the input signal 130 and generate a tool face corrected signal 131. In one embodiment, the tool face correction module 124 receives the preprocessed response 120 as the input signal 130 and generates a tool face corrected signal 131. In another embodiment, the tool face correction module receives the eccentering corrected response 140 as the input signal 130 and generates a tool face corrected signal 131. In one embodiment, the tool face correction technique is based on resampling method. A plurality of tool responses corresponding to a plurality of radial angles are determined by interpolating a plurality of detector responses of the input signal 130. The tool face corrected signal is generated by selecting a subset of the plurality of tool responses.

The at least one computer processor 126 includes at least one arithmetic logic unit, a microprocessor, a general purpose controller or a processor array to perform the desired computations or run the computer program. In one embodiment, the functionality of the at least one computer processor 126 may be limited to acquire the tool response 132. In another embodiment, the functionality of the at least one computer processor 126 may be limited to perform tool face correction. In another embodiment, the functionality of the at least one computer processor 126 is limited to perform eccentering correction. In some exemplary embodiments, functionality of the at least one computer processor 126 includes one or more of the functions of the preprocessor module 118, the tool face correction module 124, and the eccentering correction module. While the at least one computer processor 126 is shown as a separate unit, there can be a processor co-located or integrated in one or more of the modules 118, 124, 122. Alternatively, the at least one computer processor 126 can be local or remote, such as a central server or cloud based, with the communications bus 138 can be wired, wireless or a combination thereof. One or more of the at least one processor may operate in batch mode, off-line or in real time to perform eccentering distortion correction.

The memory module 128 may be a non-transitory storage medium. For example, the memory module 128 may be a dynamic random access memory (DRAM) device, a static random access memory (SRAM) device, flash memory or other memory devices. In one embodiment, the memory module 128 may include a non-volatile memory or similar permanent storage device, media such as a hard disk drive, a floppy disk drive, a compact disc read only memory (CD-ROM) device, a digital versatile disc read only memory (DVD-ROM) device, a digital versatile disc random access memory (DVD-RAM) device, a digital versatile disc rewritable (DVD-RW) device, a flash memory device, or other non-volatile storage devices. In one specific embodiment, a non-transitory computer readable medium may be encoded with a program to instruct the at least one computer processor 126 to generate the eccentering corrected response 140.

Figure 2:
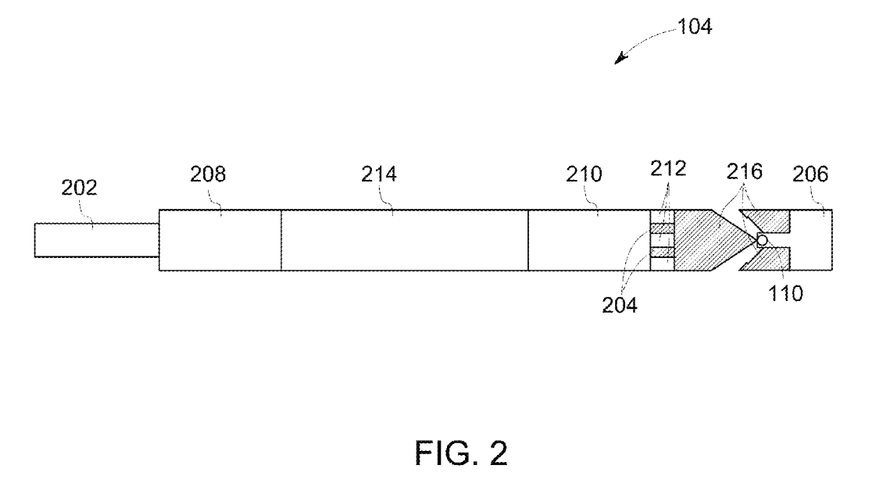
FIG. 2 illustrates the logging tool used for acquiring tool response in accordance with an exemplary embodiment.

FIG. 2 illustrates the logging tool 104 used for acquiring tool response in accordance with an exemplary embodiment. The tool includes an inclinometer 202, a plurality of collimators 204, 216 a source holder 206, a power system 208, detector electronics 210, a detector array 212, and tool electronics 214. The inclinometer 202 is used to orient the measurements within the borehole and is configured to operate with other completion logging measurements including multi-finger caliper, collar locator, and a basic production logging tool string. The collimator 204 provides azimuthal collimation so that detected data at each detector is independent of other detector outputs. The collimator 216 along with the source to detector spacing determines where the single Compton scattering events occur. The source holder 206 positions the radiation source 110. The detector array 212, and the tool electronics 214 are powered by the power system 208. The tool electronics 214 is configured to communicate with the up hole telemetry based logging system. The temperature rating of the tool electronics 214 and the detector array 212 operating in the down hole is set at a high value suitable for subterranean operation. In one embodiment, the temperature rating of the tool electronics 214 and the detector array 212 is one seventy five degree centigrade. The radiation source 110 provides gamma rays. The tool 104 uses a well collimated, short-spaced source to detector array. Each of the plurality of detectors in the detector array 212 is capable of acquiring count rates of 400 kHz. The tool 104 is configured to operate at a logging speed of 5 to 10 feet/minute with a vertical resolution of 2 inches. In one embodiment, the detector array includes six detectors in a 2.5 inch diameter pressure housing. The tool detects Compton-scattered gamma ray photon counts in an energy range of about 100 keV to about 662 keV. In one embodiment, the plurality of detectors in the detector array 212 are configured to detect gamma rays in three energy ranges. In one embodiment, spacing between the source to detector array and aperture of the plurality of collimators 204, 216 is adjusted to optimize void sensitivity of the tool for a variety of inner conduit diameters. For example, a shorter spacing is used for smaller diameter conduits and a longer spacing is used for larger diameter conduits.

Figure 3:
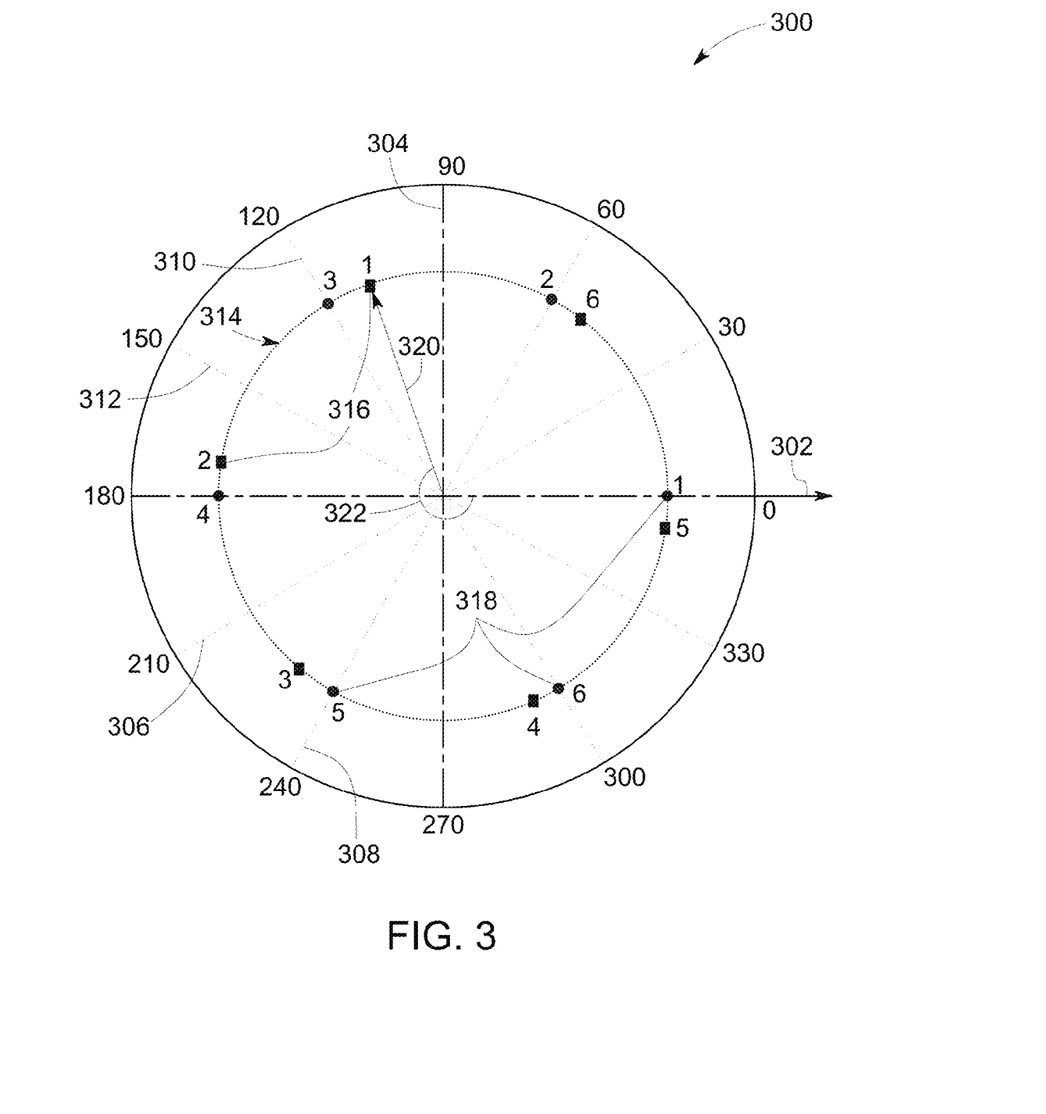
FIG. 3 is a schematic illustrating tool face corrected response in accordance with an exemplary embodiment.

FIG. 3 is a graph 300 illustrating tool face correction technique in accordance with an exemplary embodiment. The graph 300 is a polar plot of the plurality of detector responses before and after the tool face correction. A plurality of points 316 represented by small squares are representative of plurality of detector responses before the tool face correction. A plurality of points 318 represented by small circles are representative of the plurality of detector responses after the tool face correction. The graph 300 also includes a plurality of radial lines 302, 304, 306, 308, 310, 312 passing through the center of the polar plot corresponding to radial angles of thirty degrees. The radial line 302 is representative of high side of the well. A line 320 joining detector response corresponding to detector one with center of the graph determines tool face angle of the response of the detector one. In the illustrated example, the line 320 forms an angle 322 with the line 302 in a clockwise direction. The tool face angle in this example is two hundred and forty nine degrees.

The tool face correction involves interpolating plurality of detector responses represented by the plurality of points 316 to generate a plurality of samples on a dotted circle 314. The plurality of samples on the dotted circle 314 is referred herein as a plurality of responses. In one embodiment, the plurality of responses are determined by using cubic splines. Other mathematical functions may also be used for interpolating the plurality of detector responses represented by the plurality of points 316 to generate the plurality of responses. A resampling method is used to determine a tool face corrected responses based on the plurality of responses on the dotted circle 314. The resampling is performed by selecting a plurality of corrected samples represented by the plurality of points 318 from the plurality of responses on the dotted circle 314. The corrected sample corresponding to the detector one is at the high side of the well represented by the radial line 302. The corrected sample corresponding to the detector three is along the radial line 310 at one hundred and twenty degrees from the high side of the well. Similarly, the plurality of corrected samples represented by the plurality of points 318 are along radial lines forming angles with the high side represented by the radial line 302 in sixty degree steps in clockwise direction.

Figure 4:
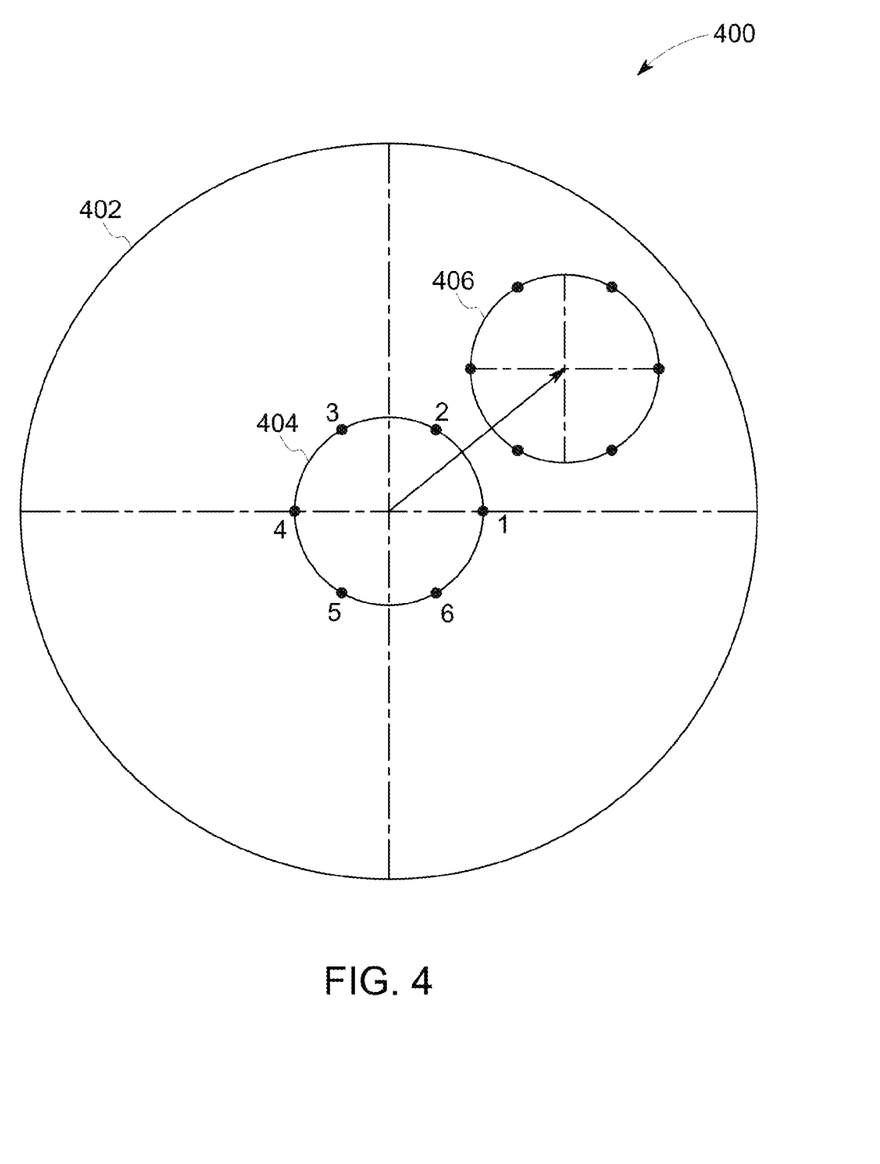
FIG. 4 is a schematic of a cross section of a borehole illustrating radially shifted position of the logging tool in accordance with an exemplary embodiment.

FIG. 4 is a schematic 400 illustrating relative position of the tool responsible for eccentering distortion in accordance with an exemplary embodiment. The schematic 400 shows an annulus 402 within which the tool is disposed. In a centered position, the tool 404 is at center of the annulus 402 and eccentering distortion is not present in the plurality of detector responses. In an eccentered position, the tool 406 is radially shifted towards the right from the center of the annulus 402 and the plurality of detector responses exhibit eccentering distortion. The eccentering correction technique modifies the tool response from the tool 406 in the eccentered position and generates the eccentering corrected response which is an estimated tool response from the tool 404 in the centered position.

Figure 5:
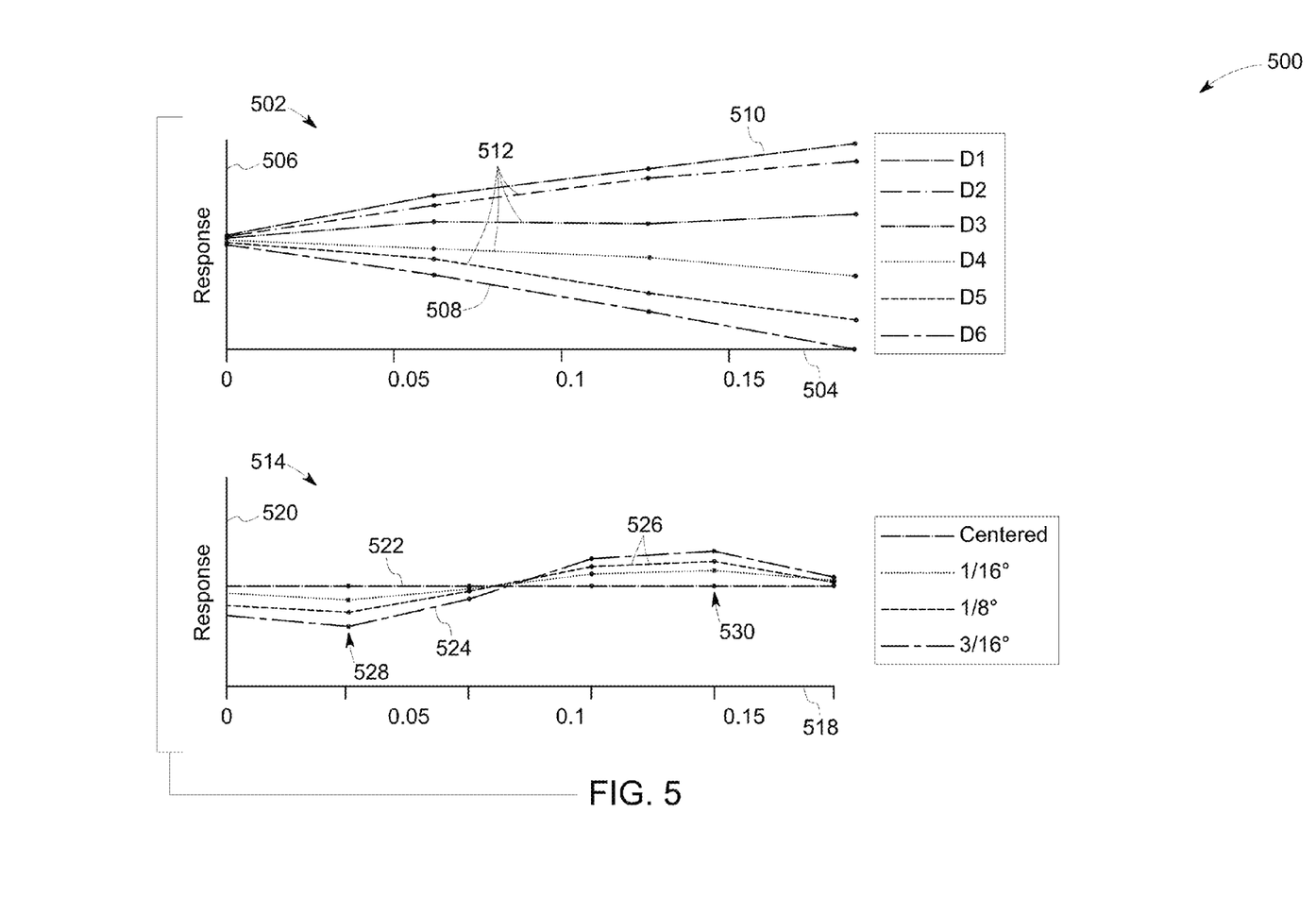
FIG. 5 is a graph illustrating spreading and sinusoidal variation in the tool response in accordance with an exemplary embodiment.

FIG. 5 is a graphical representation 500 illustrating spreading and sinusoidal variation in the tool response due to eccentering distortion in accordance with an exemplary embodiment. The graphical representation 500 includes two graphs 502, 514 illustrating the spreading and sinusoidal variation in the tool spreading respectively. The graph 502 includes an x-axis 504 representative of radial displacement in inches and a y-axis 506 representative of detector response magnitude. The graph 502 includes a plurality of curves 508, 510, 512 corresponding to the plurality of detectors. The curve 508 corresponds to the detector two is representative of decreasing response with increase in the radial shift of the tool in a direction indicated in FIG. 4. The curve 510 corresponds to detector five representative of increasing response with increase in the radial shift of the tool. It may be observed that the detector one and detector three are symmetrically positioned with respect to the detector two. Similarly, the detector four and the detector six are positioned symmetrically with respect to the detector two. These similarities are reflected in the corresponding response curves. For example, the response curves corresponding to detectors four and six are increasing as detectors one and six move towards the center of the annulus. In another example, the response curves corresponding to the detectors one and three are decreasing as the detectors one and three are moving away from the center of the annulus. As the radial displacement increase, the spread of responses from the plurality of detectors increases resulting in increased eccentering distortion.

The graph 514 includes an x-axis 518 representative of detector number and a y-axis 520 representative of response magnitude. The graph 514 includes a plurality of curves 522, 526, 524 representative of response of six detectors corresponding to a plurality of radial shifts. The curve 522 is a horizontal line representing the same response from all the six detectors corresponding to zero radial shift. There is no eccentering distortion in the detector response corresponding to the curve 522. As the radial shift increases, the eccentering distortion increases, and the response curves resembles a sinusoidal curve with larger amplitudes. The amplitude variation is maximum for the detector two and five for the increased radial shifts. The response for the detector two 528 decreases as it moves away from the center of the annulus with increasing radial shift and the response for the detector five 530 increases as the detector moves towards the center of the annulus as the radial shift increases.

Figure 6:
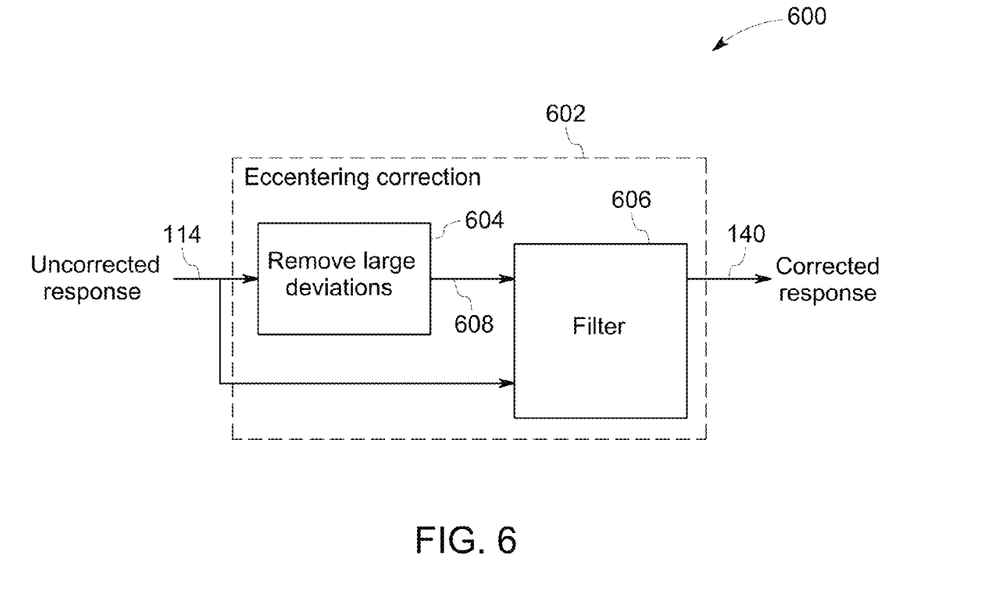
FIG. 6 is a block diagram illustrating eccentering correction technique in accordance with an exemplary embodiment.

FIG. 6 is a schematic 600 illustrating eccentering correction technique in accordance with an exemplary embodiment. The schematic 600 includes a block diagram 602 receiving the uncorrected response 114 having eccentering distortions. The block 602 includes a first module 604 for removing large deviations due to the presence of voids and a second module 606 for filtering variations due to the presence of eccentering distortions. The uncorrected response 114 corresponds to the response of one of the six detectors of the tool. The uncorrected response 114 includes components due to the presence of voids as well as contributions due to eccentering distortion of the tool. In one embodiment, the uncorrected response is the tool response acquired from the logging tool. In another embodiment, the uncorrected response is the tool face corrected signal received from the tool face correction module. The components due to the presence of voids are relatively large compared to the contributions from the eccentering distortions of the tool. In order to detect and correct the eccentering distortions, the effect of the components due to voids is reduced as a first step. The uncorrected response 114 is processed by the first module 604 to generate a modified detector response 608. The modified detector response 608 is obtained by removing a large deviation caused by the defect such as presence of void, from a detector response among the plurality of detector responses. The modified detector response 608 is processed by the second module 606 to generate eccentering corrected response 140. The eccentering corrected response 140 is obtained by filtering a sinusoidal component from the modified detector response 608. The eccentering correction is applied to each of the plurality of detector responses obtained from the tool. In the embodiment where the uncorrected response corresponds to the tool response, the eccentering corrected response 140 may be further processed by the tool face correction module using the tool face correction technique to remove the tool face distortion.

In one embodiment, the first module 604 includes an interpolator to interpolate samples of the uncorrected response 114 and generate an interpolated uncorrected response. In one embodiment, the samples of the uncorrected response are the samples of one of the plurality of detector responses. The first module further includes a differentiator which generates derivatives of the interpolated uncorrected response. In one embodiment, a plurality of inflection points are determined in the interpolated uncorrected response based on the derivative of the interpolated uncorrected response. The derivative of the detector response is determined using a second order finite difference approximation. A pair of inflection points among the plurality of inflection points is identified. The pair of inflection points are successive inflection points among the plurality of inflection points. An absolute difference value is determined based on the sample values of the interpolated uncorrected response corresponding to the pair of inflection points. When the absolute difference is more than a deviation threshold, one or more samples of the uncorrected (detector) response responsible for the inflection point is modified. In one embodiment, a constant value equal to the detector response before the pair of inflection points in the uncorrected response is used to replace the uncorrected response samples responsible for the inflection points. The detector response is modified for each pair of inflection points among the plurality of inflection points.

In one embodiment, the detector response is filtered at each of the plurality of depths using the modified detector response to generate a corrected detector response. In one embodiment, a notch filter is used to process the detector response. The notch filter is a finite impulse response filter having a normalized center frequency of PI by three radians per sample. The processing of the detector response using the notch filter includes convolving the detector response with the finite impulse response of the notch filter.

In another embodiment, the second module 606 determines a frequency transformation of the modified detector response 608. For example, the second module 606 determines a plurality of discrete Fourier transform coefficients corresponding to the modified detector response 608. One or more pairs of coefficients among the plurality of discrete Fourier transform coefficients, corresponding to sixty degrees are identified. The one or more pairs of coefficients are replaced by zero value to eliminate eccentering distortion in the frequency transformation of the modified detector response 608 to generate a corrected frequency response of the modified detector response. An inverse discrete Fourier transformation of the corrected frequency response is determined to generate the eccentering corrected response 140.

Figure 7:
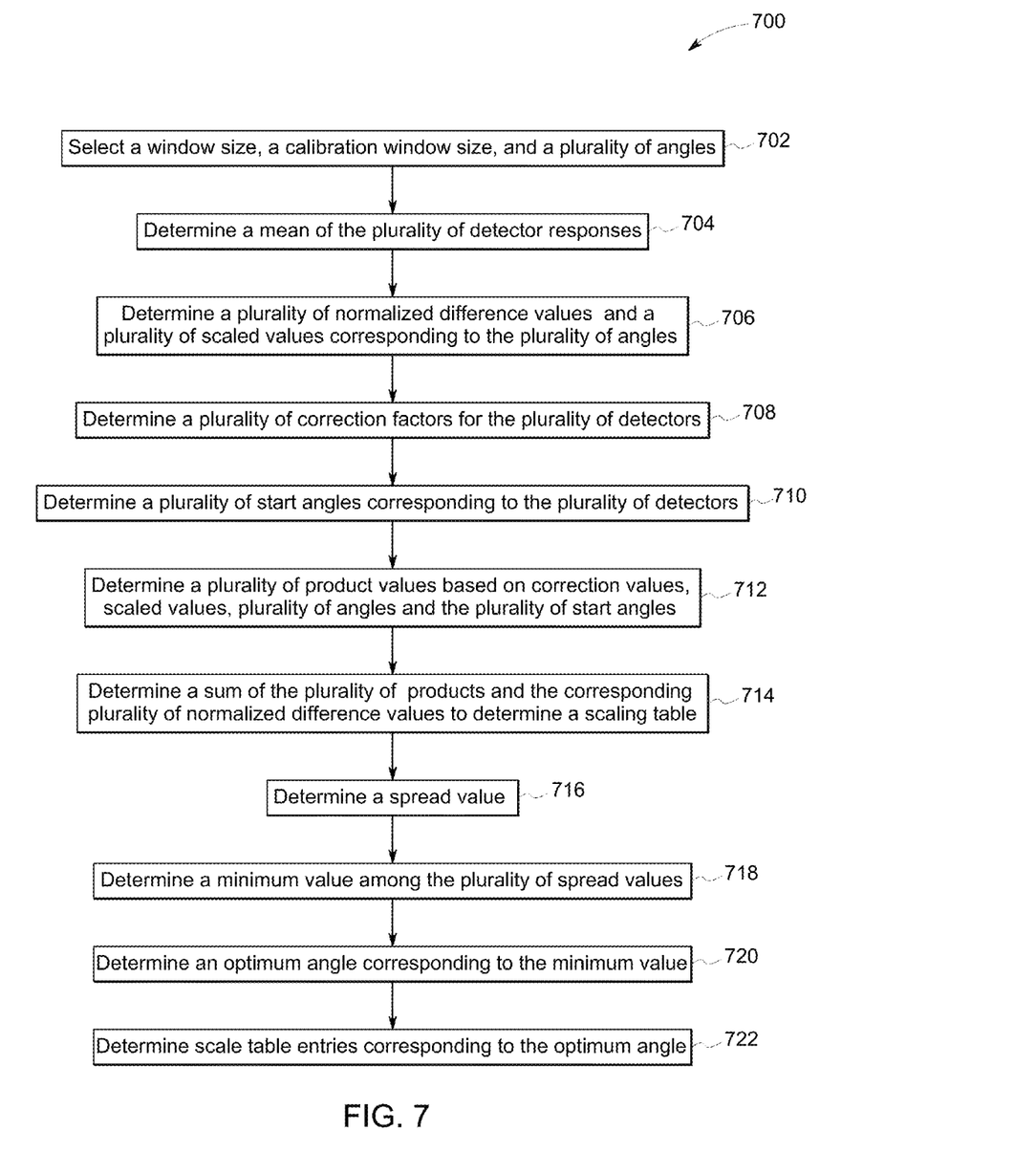
FIG. 7 is a flow chart illustrating an eccentering correction technique in according to an exemplary embodiment.

FIG. 7 is a flow chart 700 of a method of correcting eccentering distortion from the plurality of detector responses in accordance with an exemplary embodiment. The method includes selection of a depth window, a calibration window within the depth window and a plurality of angles based on the geometry of the logging tool and radius of the inner conduit. The term 'depth window' referred herein corresponds to a range of depth values. The plurality of angles corresponds to angular values between zero degree and three hundred sixty degrees 702. The calibration window has a duration smaller than the depth window and is used to determine a scaling tables corresponding to each of the detector among the plurality of detectors and for each of the selected angles.

In one embodiment of the eccentering correction technique, a plurality of correction scales corresponding to the plurality of detectors at a particular depth value are determined. The technique further includes scaling each of the plurality of detector responses by a corresponding correction scale among the plurality of correction scales. In one embodiment, the plurality of correction scales are determined based on the plurality of responses measured at a depth where the logging tool is centered.

In another embodiment of the eccentering correction technique, a mean count of a plurality of count responses corresponding to the plurality of detectors is determined 704. A plurality of difference values corresponding to a plurality of pair of detectors is determined based on count responses of the six detectors in the calibration window. As an example, a first difference value is obtained by determining a difference between the count response of first detector and the count response of the second detector. A second difference value is determined by finding a difference value between the count response of the third detector and the count response of the fourth detector. A third difference value is obtained by determining a difference of count response of the fifth detector and the count response of the sixth detector. The plurality of difference values are normalized by the mean value to determine a plurality of normalized difference values in step 706.

A plurality of angles are selected in the range of zero to three hundred and sixty degrees. Further, the plurality of normalized difference values for each of the detector is normalized by the plurality of angles to determine a plurality of scaled values in step 706. The plurality of count responses are arranged in descending order of their values. A plurality of correction factors for the plurality of detectors are determined based on the count response values 708. A value of one is assigned as the correction factor for the first three detectors having higher count response. A value of minus one is assigned as the correction factors for the last three detectors having lower count response. In one embodiment, count response of a detector is compared with the mean count to determine if the detector has a higher count value or a lower count value. A plurality of start angles are determined corresponding to the plurality of detectors, wherein the start angle is representative of initial angle of the corresponding detector 710. The plurality of start angles are added to the plurality of angles to generate a table of angles with each entry corresponding to one detector among the plurality of detectors and one angle among the plurality of angles.

A product of correction value, scaled value, and an entry in the table of angles for each of the detector and angle combination to generate a plurality of product values 712. A scaling table having a plurality of scaling factors as entries is determined by adding the normalized difference values with the corresponding product value among the plurality of product values 714.

A spread value is determined for each of the plurality of angles by determining a difference of maximum value and a minimum value corresponding to the each of the plurality of angles 716. The maximum value for an angle is determined as the maximum of the plurality of scaling factors corresponding to the plurality of detectors for the angle. The minimum value for an angle is determined as the minimum of the plurality of scaling factors corresponding to the plurality of detectors for the angle. A plurality of spread values is determined corresponding to the plurality of angles. A minimum value among the plurality of spread values is determined as the minimum spread value 718. An optimum angle corresponding to the minimum spread value is determined in step 720. A scaling table having a plurality of scale table entries is determined based on the optimum angle in step 722. A plurality of corrected counts is obtained from the scaling table corresponding to the optimum angle 720. The plurality of corrected counts determine the eccentering corrected response.

Figure 8:
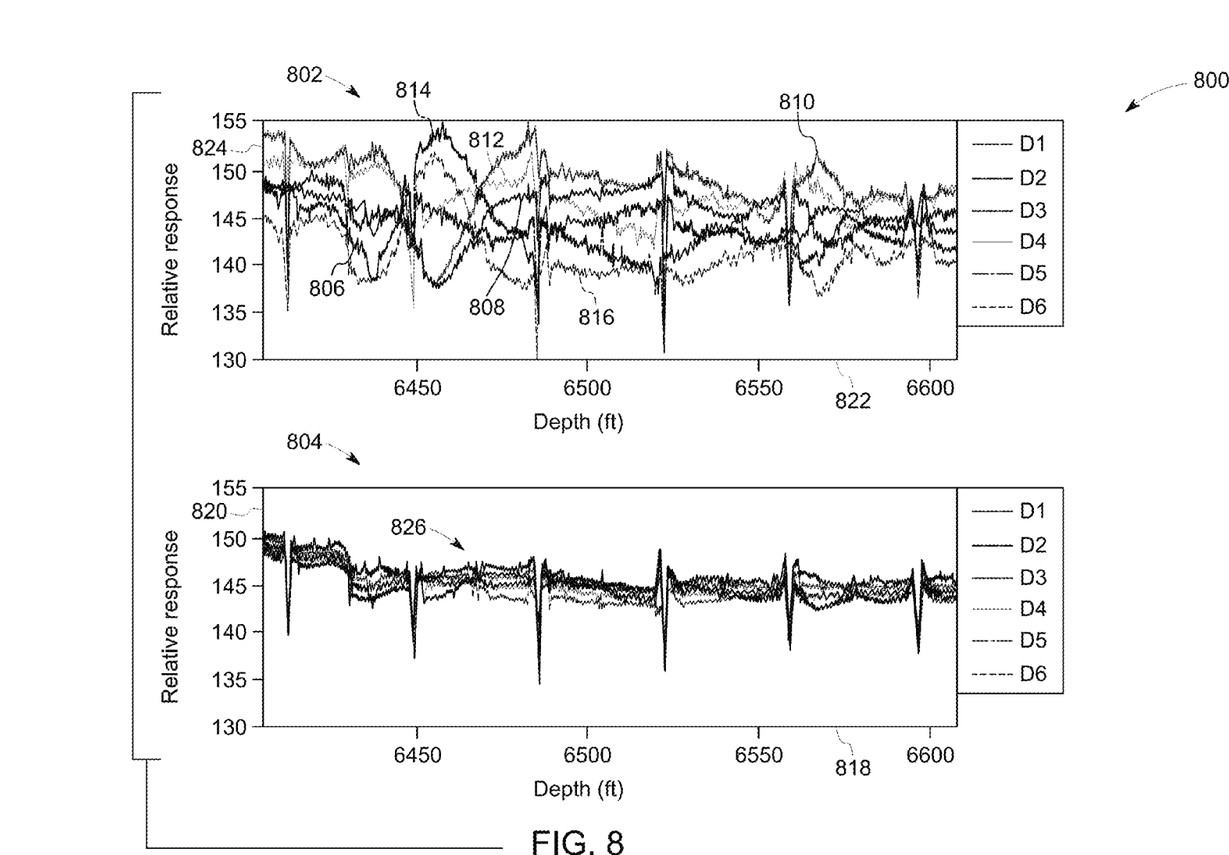
FIG. 8 is a graphical representation illustrating effect of eccentering correction technique on the response of the logging tool in accordance with an exemplary embodiment.

FIG. 8 is a graphical representation illustrating effect of eccentering correction technique on the response of the logging tool in accordance with an exemplary embodiment. The FIG. 8 includes a graph 802 illustrating a plurality of detector responses having eccentering distortion. The graph 802 includes an x-axis 822 representative of depth in feet and a y-axis 824 representative of response value. The graph 800 includes six curves 806, 808, 810, 812, 814, 816 representative of scattered gamma ray photon counts measured from the six detectors of the logging tool. The six curves 806, 808, 810, 812, 814, 816 exhibit large variations as a function of depth. The FIG. 8 also includes a graph 804 illustrating the plurality of corrected detector responses corresponding to the responses of graph 802. The graph 804 includes an x-axis 818 representative of depth in feet and a y-axis 820 representative of response value. A plurality of curves 826 represents eccentering corrected detector responses. It should be noted that the variations among the plurality of curves 826 is reduced due to the reduction of distortions due to radial shifts of the logging tool.

Figure 9:
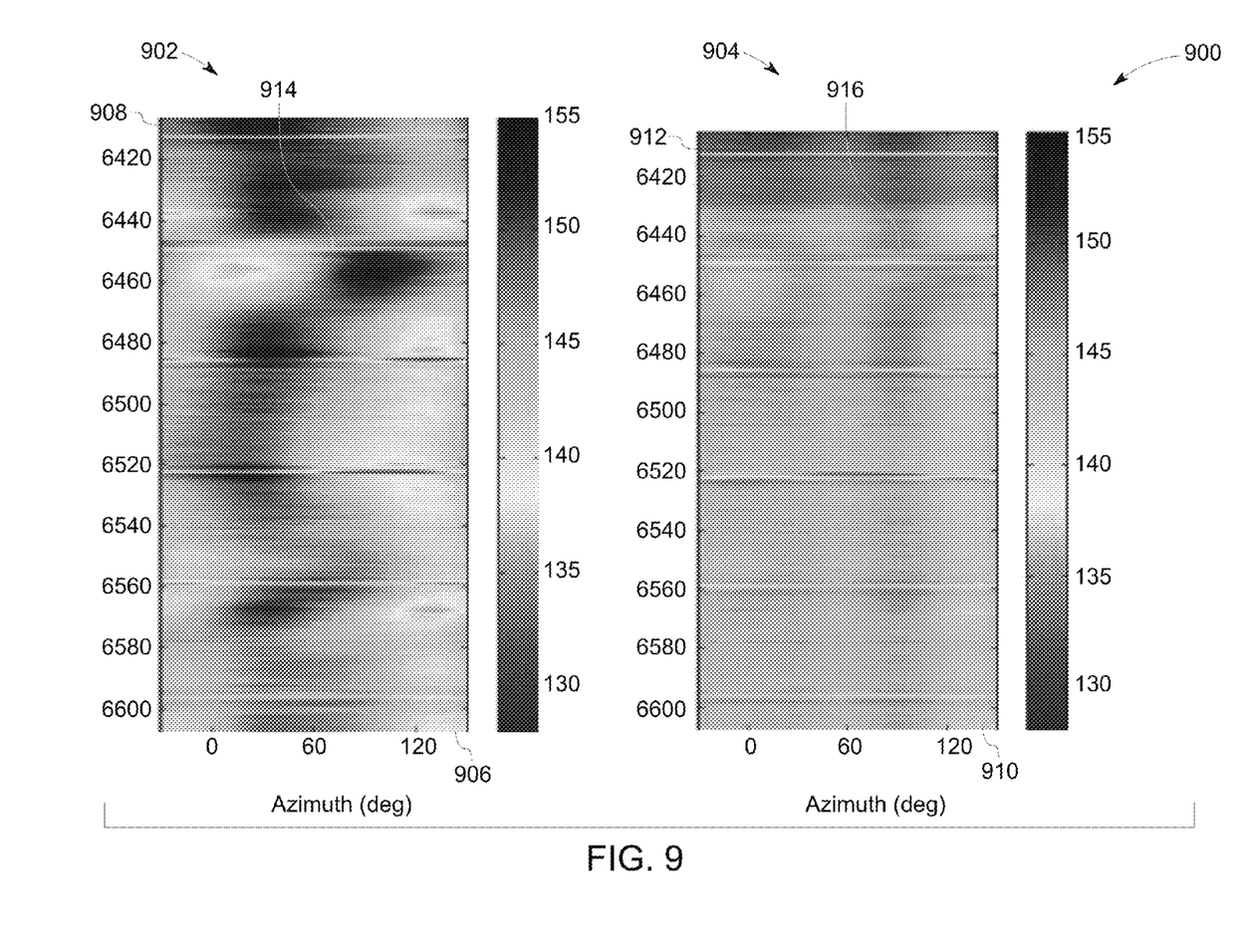
FIG. 9 is a graphical representation of heat map images corresponding to responses of FIG. 8 illustrating the effect of eccentering correction technique in accordance with an exemplary embodiment.

FIG. 9 is a graphical representation 900 of heat map images corresponding to responses of FIG. 8 illustrating the effect of eccentering technique in accordance with an exemplary embodiment. The graphical representation 900 includes two heat maps 902, 904 representative of response before and after eccentering correction. The heat map 902 corresponds to the plurality of curves of the graph 802 and the heat map 904 corresponds to the plurality of curves of the graph 804. The heat map 902 has a horizontal axis 906 representative of azimuth angle and a vertical axis 908 representative of depth. The heat map 902 has portions 914 indicative of eccentering distortions due to spread of the plurality of detector responses. The map 904 representative of eccentering corrected response includes a horizontal axis 910 representative of azimuth angle and a vertical axis 912 representative of depth. In the corrected response, the map shows portions 916 with eccentering corrected response.

Figure 10:
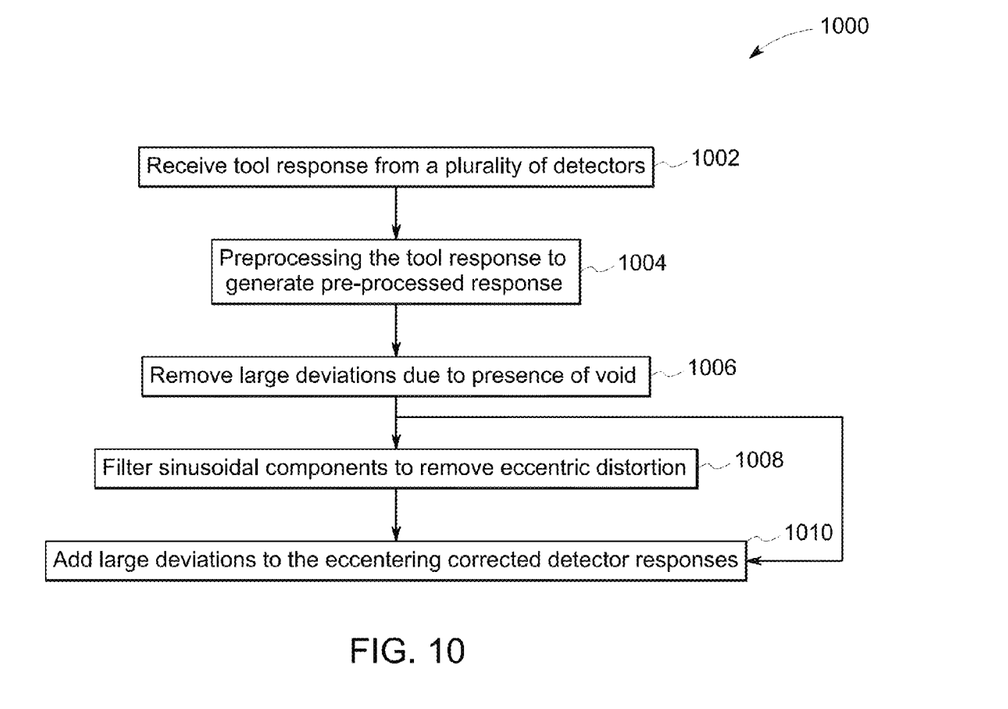
FIG. 10 is a flow chart illustrating a method of correcting motion artifacts in processing signals acquired by the tool in accordance with an exemplary embodiment.

FIG. 10 is a flow chart 1000 illustrating a method of correcting motion artifacts in processing signals acquired by logging tool in accordance with an exemplary embodiment. A tool response from a logging tool disposed in an inner conduit configured to examine a material filled in an annular space is formed by an outer conduit and the inner conduit disposed within the outer conduit is received 1002. The tool response comprises an eccentric distortion caused by a radial shift of the logging tool.

The tool response is processed to reduce high frequency noise components and generate a pre-processed response 1004. The pre-processed response is processed to correct the eccentric distortion using an eccentering correction technique and generate an eccentering corrected response. The eccentering correction technique includes removing large deviations due to the presence of void 1006. The eccentering correction technique further includes filtering sinusoidal components representative of eccentric distortions to generate motion corrected response 1008. The eccentering correction technique also includes adding large deviations due to the presence of void back to the motion corrected response to generate eccentering corrected response 1010.

Not necessarily all such objects or advantages described above may be achieved in accordance with any particular embodiment. Thus, for example, those skilled in the art will recognize that the systems and techniques described herein may be embodied or carried out in a manner that achieves or improves one advantage or group of advantages as taught herein without necessarily achieving other objects or advantages as may be taught or suggested herein.

While the technology has been described in detail in connection with only a limited number of embodiments, it should be readily understood that the specification is not limited to such disclosed embodiments. Rather, the technology can be modified to incorporate any number of variations, alterations, substitutions or equivalent arrangements not heretofore described, but which are commensurate with the spirit and scope of the claims. Additionally, while various embodiments of the technology have been described, it is to be understood that aspects of the specification may include only some of the described embodiments. Accordingly, the specification is not to be seen as limited by the foregoing description, but is only limited by the scope of the appended claims.

The invention claimed is:

1. A method, comprising:
receiving a tool response from a logging tool disposed in an inner conduit configured to examine a material filled in an annular space formed by an outer conduit and the inner conduit disposed within the outer conduit, wherein the tool response comprises scattered gamma ray photon counts distorted by a radial shift of the logging tool, and wherein the tool response comprises a plurality of detector responses corresponding to a plurality of detectors of the logging tool;
generating an eccentering corrected response by:
determining a plurality of correction scales corresponding to the plurality of detectors at a depth; and
scaling each of the plurality of detector responses by a corresponding correction scale among the plurality of correction scales,
wherein the eccentering corrected response is usable for detecting a defect in the annular space.

2. The method of claim 1, wherein each of the plurality of detector responses comprises scattered gamma ray photon counts measured from a plurality of depths of the annular space.

3. The method of claim 2, wherein generating the eccentering corrected response comprises:
removing a large deviation from each of the plurality of detector responses to generate a modified tool response, wherein the large deviation is caused by the defect; and
filtering the tool response at each of the plurality of depths using the modified tool response to generate an eccentered corrected response.

4. The method of claim 3, wherein the filtering comprises convolving the detector response with a finite impulse response notch filter having a normalized center frequency of PI by three radians per sample.

5. The method of claim 3, wherein the removing comprises:
interpolating a detector response as a function of depth among the plurality of detector responses using a cubic spline function to generate an interpolated detector response;
determining a pair of inflection points in the interpolated detector response based on an estimate of derivative of the interpolated detector response determined using a second order finite difference approximation;
determining an absolute difference value based on sample values of the interpolated detector response corresponding to the pair of inflection points;
modifying one or more sample values of the detector response corresponding to the pair of inflection points when the absolute difference value is greater than a deviation threshold.

6. The method of claim 1, wherein the plurality of correction scales is determined based on the plurality of detector responses measured at a depth where the logging tool is centered.

7. The method of claim 1, wherein the eccentering technique comprise:
selecting a depth window having a range of depth values and a calibration window with in the depth window;
selecting a plurality of angles based on the geometry of the logging tool and radius of the inner conduit;
determining a plurality of scaling factors corresponding to the plurality of detectors for each angle among the plurality of angles based on the plurality of detector responses;
determining a spread value corresponding to the plurality of detectors for each angle among the plurality of angles to generate a plurality of spread values;
determining a minimum spread value based on the plurality of spread values and determining an optimum angle corresponding to the minimum spread value; and
selecting the eccentering corrected response based on the optimum angle.

8. The method of claim 7, wherein determining the plurality of scaling factors comprises:
determining a mean count based on a plurality of count responses corresponding to the plurality of detectors within the calibration window;
determining a plurality of normalized difference values corresponding to the plurality of detectors based on the plurality of count responses within the calibration window and the mean count;

determining a plurality of scaled values corresponding to the plurality of detectors based on the plurality of normalized difference values normalized by the plurality of angles;

determining a plurality of correction factors corresponding to the plurality of detectors based on sign of difference between the mean count and the plurality of detector responses within the calibration window;

determining a table of angles based on a plurality of start angles corresponding to the plurality of detectors and the plurality of angles;

determining a plurality of product values based on the plurality of scaled values, the plurality of correction values, and the table of angles; and determining a scaling table based on the plurality of product values and the plurality of normalized difference values.

9. A system, comprising:

a logging tool disposed in an inner conduit configured to examine a material filled in an annular space formed by an outer conduit and the inner conduit disposed in the outer conduit to generate a tool response, wherein the logging tool comprises a plurality of detectors and the tool response comprises scattered gamma ray photon counts distorted by a radial shift of the logging tool, and wherein the tool response comprises a plurality of detector responses corresponding to the plurality of detectors of the logging tool;

a data transmission device coupled to the plurality of detectors and configured to transmit data detected by the plurality of detectors; and at least one computer processor communicatively coupled to a memory and the data transmission device via a communications bus and configured to:

receive the tool response transmitted from the data transmission device;

determine a plurality of correction scales corresponding to the plurality of detectors at a depth; and scale each of the plurality of detector responses by a corresponding correction scale among the plurality of correction scales to generate an eccentering corrected response by correcting effects of the radial shift in the tool response, wherein the eccentering corrected response is usable for detecting a defect in the annular space.

10. The system of claim 9, wherein each of the plurality of detector responses comprises scattered gamma ray photon counts measured from a plurality of depths of the annular space.

11. The system of claim 10, wherein the at least one computer processor is configured to:

remove a large deviation from each of the plurality of detector responses to generate a modified tool response, wherein the large deviation is caused by the defect; and filter the tool response at each of the plurality of depths using the modified tool response to generate eccentered corrected response.

12. The system of claim 11, wherein the at least one computer processor is configured to filter the detector response using a finite impulse response notch filter having a normalized center frequency of PI by three radians per sample.

13. The system of claim 11, wherein the at least one computer processor is configured to:

interpolate a detector response as a function of depth among the plurality of detector responses using a cubic spline function to generate an interpolated detector response;

determine a pair of inflection points in the detector response based on an estimate of derivative of the detector response determined using a second order finite difference approximation;

determine an absolute difference value based on sample values of the interpolated detector response corresponding to the pair of inflection points;

modify one or more sample values of the detector response corresponding to the pair of inflection points when the absolute difference value is greater than a deviation threshold.

14. The system of claim 9, wherein the at least one computer processor is configured to determine the plurality of correction scales based on the plurality of detector responses measured at a depth where the logging tool is centered.

15. The system of claim 9, wherein the at least one computer processor is configured to:

select a depth window having a range of depth values and a calibration window with in the depth window;

select a plurality of angles based on the geometry of the logging tool and the radius of the inner conduit;

determine a plurality of scaling factors corresponding to the plurality of detectors for each angle among the plurality of angles based on the plurality of detector responses;

determine a spread value corresponding to the plurality of detectors for each angle among the plurality of angles to generate a plurality of spread values;

determine a minimum spread value based on the plurality of spread values and determining an optimum angle corresponding to the minimum spread value; and select the eccentering corrected response based on the optimum angle.

16. The system of claim 15, wherein the at least one computer processor is configured to:

determine a mean count based on a plurality of count responses corresponding to the plurality of detectors within the calibration window;

determine a plurality of normalized difference values corresponding to the plurality of detectors based on the plurality of count responses within the calibration window and the mean count;

determine a plurality of scaled values corresponding to the plurality of detectors based on the plurality of normalized difference values normalized by the plurality of angles;

determine a plurality of correction factors corresponding to the plurality of detectors based on sign of difference between the mean count and the plurality of detector responses within the calibration window;

determine a table of angles corresponding to the plurality of start angles corresponding to the plurality of detectors and the plurality of angles;

determine a plurality of product values based on the plurality of scaled values, the plurality of correction values, and the table of angles; and determine a scaling table based on the plurality of product values and the plurality of normalized difference values.

17. A non-transitory computer readable medium having a program to instruct at least one computer processor to:

receive a tool response from a logging tool disposed in an inner conduit configured to examine a material filled in an annular space formed by an outer conduit and the inner conduit disposed within the outer conduit, wherein the tool response comprises scattered gamma ray photon counts distorted by a radial shift of the logging tool, and wherein the tool response comprises a plurality of detector responses corresponding to the plurality of detectors of the logging tool;

determine a plurality of correction scales corresponding to the plurality of detectors at a depth; and scale each of the plurality of detector responses by a corresponding correction scale among the plurality of correction scales to generate an eccentering corrected response, wherein the eccentering corrected response is usable for detecting a defect in the annular space.

* * * * *